3,405,103
PROCESS FOR PREPARING POLYVINYL PHTHAL-
ATE IN WHICH THE IMPROVEMENT IS THE USE
OF ACTIVATED POLYVINYL ALCOHOL
Carlton L. Crane and Donald F. Ingerick, Rochester,
N.Y., assignors to Eastman Kodak Company, Rochester, N.Y., a corporation of New Jersey
No Drawing. Filed Nov. 7, 1966, Ser. No. 592,315
7 Claims. (Cl. 260—78.4)

This invention relates to improved processes for preparing dicarboxylic acid ester of polyvinyl alcohols. More specifically, the present invention relates to improvements in esterification processes, which improvements not only result in faster reaction rates, but also result in the manufacture of polyvinyl dicarboxylic acid ester (such as polyvinyl phthalate) having improved solubility properties in certain important solvent systems.

In known processes for manufacturing dicarboxylic acid esters of polyvinyl alcohol by reacting together a dicarboxylic acid anhydride and polyvinyl alcohol, generally the reactants have simply been brought together at relatively elevated temperatures in the presence of a solvent and one or more catalysts (such as pyridine or anhydrous sodium acetate). In the most widely used of these processes, there is present in the reaction mixture a quantity of a lower fatty acid such as acetic acid. Generally these prior art processes involve simply the mixing together of the various materials, the warming of the resulting reaction mixture with agitation for a period of several hours, and subsequently recovering the resulting polyvinyl dicarboxylic acid ester product by any of a number of conventional methods including the addition of a large amount of water to the reaction mixture, whereby the polyvinyl dicarboxylic acid ester material is precipitated from the mass and subsequently separated from the other materials by filtration.

Since the details of the basic processes (of which the present invention constitutes an improvement), are well known to those skilled in the art, procedural details of these well known processes need not be described exhaustively herein. However, for the purpose of setting out some of the details of such prior art processes, reference is made to U.S. Patent 2,759,909 of Hiatt and Emerson, the disclosure of which is hereby incorporated into the present patent application by reference. In the disclosure of this Hiatt et al. patent, details are set out and directed to a preferred process involving the phthalylation of polyvinyl alcohol in the presence of glacial acetic acid and anhydrous sodium acetate catalyst.

One of the shortcomings of such prior art processes heretofore was the length of time required to convert the desired amount of polyvinyl alcohol. Still another shortcoming of such prior art processes was that their use resulted in the manufacture of a polyvinyl dicarboxylic acid ester product such as polyvinyl phthalate that was generally not completely soluble in organic solvents such as ethyl alcohol, acetone, and lower alkalene halides and in aqueous sodium bicarbonate solutions. For example, products manufactured by these conventional processes exhibited widely variable and unpredictable solubilities in these solvents when they were attempted to be dissolved in the solvents at levels of 5 weight percent or more for the purpose of utilizing the resulting solutions in the manufacture of films, adhesives, and the like.

It has now been discovered that both of these basic problems can be overcome by practicing the improved processes of the present invention. The present improved processes involve (a) Presoaking the polyvinyl alcohol with water, and
(b) Then effectively dehydrating the resulting presoaked or "activated" polyvinyl alcohol prior to the time that the dicarboxylic acid anhydride is intermixed with the polyvinyl alcohol.

Otherwise, the overall esterification processes (of which the present invention represents a significant improvement) can be conducted in a conventional manner, except that not as much time need be consumed in order to react the polyvinyl alcohol with the dicarboxylic acid anhydride to the desired extent.

The "presoak" step of the present processes can be conducted using conventional equipment by simply intermixing either water, per se, or a mixture of water and a lower fatty acid such as acetic acid with the polyvinyl alcohol (which is generally in a particulated form in order to aid in the ready absorption of the water, and preferably in the form of a powder having particles averaging less than about 1000 microns in diameter); then permitting the water to remain in contact with the polyvinyl alcohol for a period of time sufficient for water to penetrate into the particles of polyvinyl alcohol and to thereby, somehow, "activate" the polyvinyl alcohol. While the amount of time necessary for this to occur to a significant extent varies somewhat depending on the temperature of the polyvinyl alcohol-water mixture during this "presoak" step and the particle size of the polyvinyl alcohol, generally for optimum results in the practice of the present invention this contact time should be at least about 10 minutes and preferably more than 20 minutes. While no maximum time can realistically be set for this contact period, since no substantial harmful effects are known to occur as a result of relatively prolonged contact periods, generally it is preferred that the contact period of time be at most about 8 hours, although in most instances even as little as 30 minutes is a more than adequate contact time.

Although the presoak step of this invention can be practiced under any conditions of pressure and temperature in which the water remains in the liquid state during the contact period and the polyvinyl alcohol is not thermally decomposed, it is generally preferred that temperatures within the range of from about 40° F. to about 212° F. be utilized. Still further preferred during this contacting step is a temperature of the aqueous polyvinyl alcohol mixture within the range of from about 70° F. to about 160° F.

The amount of water that is utilized for the above-described contacting step should represent at least about 5 weight percent of the resulting mixture. The term "resulting mixture" in this instance is intended to mean the total combined weight of polyvinyl alcohol, water and lower fatty acid (if one is present). When water is utilized in the contacting step of these processes (in the absence of a significant amount of lower fatty acid) generally relatively large amounts of water (for example, between about 10% and about 80%) should be utilized for best results. When significant amounts of lower fatty acids (such as, more than 5% of the resulting mixture) are present in the mixture, generally significantly improved results, as compared with those of prior art processes, can be obtained with relatively smaller quantities of water (for example between about 5 and about 15%, based on the combined weight of polyvinyl alcohol, water, and lower fatty acid). However, larger amounts of water can be utilized if desired.

Since the esterification reaction must of necessity be conducted under substantially anhydrous conditions, it can be appreciated that after the polyvinyl alcohol has been "activated" with water, the free water must be effectively removed from the polyvinyl alcohol prior to the esterification step. If desired, some of the water or aqueous lower fatty acid can be removed simply by separating the activated polyvinyl alcohol therefrom via, for example, a filtration or a centrifugation step. Generally, however, because some of the polyvinyl alcohol is sometimes dissolved in the water or aqueous lower fatty acid, it is preferred to effectively remove the water by reacting it with a material such as a lower fatty acid anhydride, a material that forms an extremely stable hydrate, or even some phthalic anhydride, succinic anhydride or other dicarboxylic acid anhydride.

The term "lower fatty acid" is herein intended to encompass those alkyl monocarboxylic acids containing from 1 to 5 carbon atoms.

While the following examples are set out in terms of the overall reaction of polyvinyl alcohol with phthalic anhydride, it should be kept in mind that the present invention is useful in any process involving the reaction of polyvinyl alcohol with a dicarboxylic acid anhydride. Examples of dicarboxylic acid anhydrides that have been utilized heretofore for this purpose include phthalic anhydride, maleic anhydride, succinic anhydride, and the like.

In the following examples, all parts given are by weight unless otherwise specified.

Example 1

Onto a conventional stainless steel sigma bladed mixer are placed 104 parts of commercial polyvinyl alcohol and 71 parts of water. The temperature of the resulting mixture is raised to 80° F. and maintained for 30 minutes. During this time the mixture is stirred continuously. The 388 parts of acetic anhydride and 31 parts of anhydrous sodium acetate are poured into the mixture. The temperature of this mixture is then raised to and maintained at approximately 180° F. Then 313 parts of phthalic anhydride are added. After the mixture is stirred for 30 minutes at this temperature, 5 more parts of acetic anhydride are added. The resulting reaction mixture is then stirred for 3½ hours, during which time its temperature is maintained at approximately 180° F. The mixture is then cooled to about 90° F. Then 900 parts of water are mixed into the reaction mixture to thereby form a slurry. The slurry is then washed successively with distilled water until substantially all the uncombined acids in the filter cake have been removed therefrom. This product is then dried at 120° F. and tested for solubility at the 10 weight percent level in 5% aqueous sodium bicarbonate solution and in a mixture of ethyl alcohol and acetone (in a weight ratio or 55 parts of alcohol to 45 parts of acetone). The resulting solutions are clear and uniform. The polyvinyl phthalate product contains (by analysis) 70.8% phthalyl less than 1% phthalic acid, and the viscosity of its 10 weight percent solution in the alcohol acetone mixture at 25° C. is 26.1 centipoises.

By comparison, a comparable phthalated polyvinyl alcohol prepared conventionally (without the "presoak" step) containing about 71% phthalyl will not yield clear solutions in the solvents described.

Example 2

Into a mixer such as that described in Example 1 are placed 240 parts of commercial grade polyvinyl alcohol, 75 parts of anhydrous sodium acetate, 850 parts of glacial acetic acid, and 57 parts of water. The temperature of the mass is added, quickly raised to 170° F. and then stirred for 1 hour at this temperature. Then 350 parts of acetic anhydride are stirred into the mixture for a period of about 5 minutes. Then 768 parts of phthalic anhydride are poured into the mixture in the reactor. The resulting reaction mixture is then stirred at about 160° F. for 8 hours. Then the temperature of the reaction mixture is lowered to about 80° F. by circulating cooling water through the jacket of the mixer. To the cooled reaction mixture are then added 2400 parts of distilled water. The resulting mass is stirred for several minutes until a slurry is formed. The slurry is handled just as that described in Example 1 above, and the resulting product, displaying excellent solubility properties, just as that of Example 1, is found to contain 72% phthalyl, less than ½% phthalic acid, and has a viscosity in the 10% alcohol-acetone mixture of 19.2 centipoises at 25° C.

Example 3

In a conventional mixer such as that described in Example 1 are blended 320 parts of polyvinyl alcohol, 102 parts of anhydrous sodium acetate and 1242 parts of 95.6% acetic acid. This mixture is continuously stirred for 1 hour at a temperature of about 190° F. Into the hot mixture are then poured 1024 parts of phthalic anhydride and 365 parts of acetic anhydride. The temperature of the resulting reaction mixture is lowered to about 170° F. and maintained at that level with stirring for 5 hours. The resulting polyvinyl phthalate product is then precipated with water to form a slurry and purified in a manner such as that described in Example 1. It is found to contain 70.2% phthalyl and 0.6% phthalic acid. It has a viscosity at 25° C. and at 10 weight percent in the alcohol-acetone mixture described in Example 1 of 24.5 centipoises, and it yields completely clear solutions at the 10 weight percent level in both the alcohol-acetone mixture and the 5 weight percent aqueous sodium bicarbonate solution described previously.

Example 4

Example 3 is repeated, except that 675 parts of succinic anhydride are utilized in place of the 1024 parts of phthalic anhydride. The resulting polyvinyl succinate product has similarly excellent solubility properties.

What is claimed is:

1. In a process for preparing a polyvinyl dicarboxylic acid ester, which process comprises reacting together a dicarboxylic acid anhydride and said polyvinyl alcohol in the presence of a solvent and under substantially anhydrous conditions; the improvement which comprises (a) in a presoaking step, contacting particulated polyvinyl alcohol with water for a period of time sufficient for some of said water to penetrate into the particles of said polyvinyl alcohol, and (b) thereafter removing said water from the resulting presoaked polyvinyl alcohol by reacting said water with a lower fatty acid anhydride; steps (a) and (b) being accomplished before said dicarboxylic acid anhydride is intermixed with said polyvinyl alcohol.

2. An improved process as in claim 1, wherein said dicarboxylic acid anhydride is phthalic anhydride.

3. An improved process as in claim 1, wherein said dicarboxylic acid anhydride is succinic anhydride.

4. An improved process as in claim 2, wherein said period of time is at least about 10 minutes, and said contacting is made at a temperature above about 40° F.

5. An improved process as in claim 4, wherein said water is in admixture with a lower fatty acid while it is in contact with said polyvinyl alcohol during said presoaking step.

6. An improved process as in claim 3, wherein said lower fatty acid is acetic acid, said lower fatty acid anhydride is acetic anhydride, and the amount of said water is from about 3 percent to about 80 percent, based on the total combined weight of said polyvinyl alcohol, said water, and said acetic acid in the resulting mixture during said presoaking step.

7. An improved process as in claim 6, wherein said amount of said water is between about 5 and about 15 percent, based on the total combined weight of said polyvinyl alcohol, said water, and said acetic acid in said resulting mixture, said temperature is between about 70° F. and about 195° F., and said period of time is about 30 minutes.

References Cited

UNITED STATES PATENTS 2,759,909   8/1956   Hiatt et al. _____ 260—78.5

JOSEPH L. SCHOFER, *Primary Examiner.*

C. A. HENDERSON, Jr., *Assistant Examiner.*